(12) United States Patent
Lin

(10) Patent No.: US 12,327,860 B2
(45) Date of Patent: *Jun. 10, 2025

(54) ELECTROCHEMICAL DEVICE AND ELECTRONIC DEVICE INCLUDING SAME

(71) Applicant: NINGDE AMPEREX TECHNOLOGY LIMITED, Fujian (CN)

(72) Inventor: Chaowang Lin, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/404,251

(22) Filed: Jan. 4, 2024

(65) Prior Publication Data

US 2024/0186484 A1 Jun. 6, 2024

Related U.S. Application Data

(63) Continuation of application No. 18/170,578, filed on Feb. 17, 2023, now Pat. No. 11,923,530, which is a
(Continued)

(30) Foreign Application Priority Data

Nov. 5, 2018 (CN) .......................... 201811309419.X

(51) Int. Cl.
*H01M 4/131* (2010.01)
*H01M 4/133* (2010.01)
(Continued)

(52) U.S. Cl.
CPC .......... *H01M 4/131* (2013.01); *H01M 4/133* (2013.01); *H01M 4/134* (2013.01); *H01M 4/525* (2013.01); *H01M 10/0525* (2013.01)

(58) Field of Classification Search
None
See application file for complete search history.

(56) References Cited

U.S. PATENT DOCUMENTS

| 10,008,747 | B1 | 6/2018 | Zhamu et al. |
| 11,616,223 | B2* | 3/2023 | Lin .......................... H01M 4/58 |
| | | | 429/213 |

(Continued)

FOREIGN PATENT DOCUMENTS

| CN | 1897331 A | 1/2007 |
| CN | 101431169 A | 5/2009 |

(Continued)

OTHER PUBLICATIONS

Jin et al., "Facile and Effective Positive Temperature Coefficient (PTC) Layer for Safer Lithium-Ion Batteries," J. Phys. Chem. C 2021, 125, 1761-1766 (copy provided). (Year: 2021).*

(Continued)

*Primary Examiner* — Amanda J Barrow
(74) *Attorney, Agent, or Firm* — Maier & Maier, PLLC

(57) ABSTRACT

An electrochemical device includes a cathode, a separator and an anode. The cathode includes a cathode current collector, a first cathode active material layer including a first cathode active material, a second cathode active material layer including a second cathode active material, and an insulating layer. The first cathode active material layer is disposed between the cathode current collector and the second cathode active material layer, and the first cathode active material layer is disposed on a first region of a surface of the cathode current collector facing an anode active material layer of the anode, and the thickness of the first cathode active material layer is greater than Dv50 of the first cathode active material. The insulating layer is disposed on a second region of the surface of the cathode current
(Continued)

collector not facing the anode active material layer of the anode.

20 Claims, 5 Drawing Sheets

Related U.S. Application Data continuation of application No. 16/298,089, filed on Mar. 11, 2019, now Pat. No. 11,616,223.

(51) Int. Cl.
*H01M 4/134* (2010.01)
*H01M 4/525* (2010.01)
*H01M 10/0525* (2010.01)

(56) References Cited

U.S. PATENT DOCUMENTS

| | | | |
|---|---|---|---|
| 11,923,530 B2* | 3/2024 | Lin | H01M 4/58 |
| 2006/0051678 A1 | 3/2006 | Kim et al. | |
| 2009/0117457 A1 | 5/2009 | Davis et al. | |
| 2011/0003200 A1 | 1/2011 | Shizuka et al. | |
| 2013/0244071 A1 | 9/2013 | Lee et al. | |
| 2014/0079999 A1* | 3/2014 | Aoyagi | H01M 4/364 |
| | | | 429/221 |
| 2014/0147731 A1 | 5/2014 | Anastas et al. | |
| 2016/0064787 A1 | 3/2016 | Koido et al. | |
| 2016/0141721 A1 | 5/2016 | Mimura | |
| 2016/0172712 A1 | 6/2016 | Okutani | |
| 2016/0294015 A1 | 10/2016 | Tanaka et al. | |
| 2017/0229712 A1 | 8/2017 | Wöhrle et al. | |
| 2017/0244087 A1 | 8/2017 | Kawabe | |
| 2017/0256788 A1 | 9/2017 | Umeyama et al. | |
| 2017/0301959 A1 | 10/2017 | Takahashi et al. | |
| 2017/0338510 A1 | 11/2017 | Zhu et al. | |
| 2018/0175455 A1 | 6/2018 | Bao et al. | |
| 2018/0287215 A1* | 10/2018 | Matsui | H01M 10/0587 |
| 2019/0013545 A1* | 1/2019 | Kim | H01M 4/505 |
| 2019/0036105 A1 | 1/2019 | Park et al. | |
| 2019/0036154 A1 | 1/2019 | Kim et al. | |

FOREIGN PATENT DOCUMENTS

| | | | | |
|---|---|---|---|---|
| CN | 102903930 A | 1/2013 | | |
| CN | 1897331 B | 6/2014 | | |
| CN | 104868175 A | 8/2015 | | |
| CN | 106711388 A | 5/2017 | | |
| CN | 209045679 U | 6/2019 | | |
| DE | 102014215948 A1 | 2/2016 | | |
| JP | 2009099495 A | 5/2009 | | |
| JP | 2018170142 A | 11/2018 | | |
| WO | 10-2014-215948 | * | 2/2016 | H01M 10/0431 |
| WO | 2018036489 A1 | 3/2018 | | |
| WO | 2018048277 A2 | 3/2018 | | |

OTHER PUBLICATIONS

Office Action issued on Dec. 21, 2023, in corresponding Chinese Application No. 201811309419.X, 14 pages.

European Search Report mailed Apr. 21, 2020 in counterpart European application EP 19207091, 10 pages.

* cited by examiner

ELECTROCHEMICAL DEVICE AND ELECTRONIC DEVICE INCLUDING SAME

CROSS-REFERENCE TO RELATED APPLICATIONS

The present application is a continuation application of U.S. Patent Application No. U.S. Ser. No. 18/170,578, filed on Feb. 17, 2023, which claims the benefit of priority from the U.S. patent application Ser. No. 16/298,089, filed on Mar. 11, 2019, which claims the benefit of priority from the Chinese Patent Application No. 201811309419.X, filed on Nov. 5, 2018, the contents of which are incorporated herein by reference in their entireties.

BACKGROUND

1. Field of the Invention

Embodiments of the present application relate to the technical field of electrochemical devices, and in particular to cathodes and lithium ion batteries.

2. Description of Related Art

Electrochemical devices (such as lithium ion batteries) have become increasingly common in our daily life with the progress of science and technology and higher environmental requirements. With the popularity of lithium ion batteries, safety problems caused by external force piercing the lithium ion batteries occasionally occur at the user end, hence the safety performance of lithium ion batteries is increasingly valued by people, especially after numerous explosion events of mobile phones happen one after another, which has caused users, post-sale services and lithium ion battery manufacturers to pay more attention to the safety performance of lithium ion batteries.

At present, almost of the methods for improving the safety of lithium ion batteries are realized by reducing the energy density of the lithium ion batteries. Therefore, there is an urgent need to provide a technical means to significantly improve the safety performance of lithium ion batteries with the premise of realizing higher energy density.

SUMMARY

An embodiment of the present application is directed to an electrochemical device comprising a cathode which adopts a double-layer structure in the region covered by cathode active material layers and is provided with an insulating layer in the region not covered by any cathode active material layer. The electrochemical device can avoid failure caused by an internal short circuit when the electrochemical device is pierced by an external force, thereby effectively improving the safety performance of the electrochemical device in a piercing test.

Some embodiments of the present application provide an electrochemical device including a cathode, a separator and an anode, wherein the cathode includes a cathode current collector; a first cathode active material layer including a first cathode active material; a second cathode active material layer including a second cathode active material, wherein the first cathode active material layer is disposed between the cathode current collector and the second cathode active material layer, and the first cathode active material layer is disposed on a first surface, facing an anode active material layer of the anode, of the cathode current collector; and an insulating layer, wherein the insulating layer is disposed on a second surface, that is not facing the anode active material layer of the anode, of the cathode current collector.

According to some embodiments of the present application, an electrode assembly of the electrochemical device is of a wound structure, wherein the second surface includes a first uncovered foil region located outside the electrode assembly and having the first surface as its opposite surface, a second uncovered foil region located outside the electrode assembly and having an opposite surface other than the first surface, and a third uncovered foil region located inside the electrode assembly.

According to some embodiments of the present application, the insulating layer is disposed at least on the first uncovered foil region.

According to some embodiments of the present application, the average particle size of the first cathode active material is smaller than the average particle size of the second cathode active material, and the average particle size of the first cathode active material is from about 0.2 μm to about 15 μm. The average particle size (Dv50) refers to a particle size which accounts for 50% of the cumulative volume of the small particle size side in volume-based particle size distribution.

According to some embodiments of the present application, the particle size of 90% of the cumulative volume (Dv90) of the first cathode active material is 40 μm or less, and the particle size of 90% of the cumulative volume refers to a particle size which accounts for 90% of the cumulative volume of the small particle size side in volume-based particle size distribution.

According to some embodiments of the present application, a ratio of the average particle size of the first cathode active material to the average particle size of the second cathode active material is from about 1:1 to about 1:40.

According to some embodiments of the present application, the thickness of the first cathode active material layer is from about 0.5 μm to about 15 μm, and the thickness of the second cathode active material layer is from about 30 μm to about 1000 μm.

According to some embodiments of the present application, a ratio of the thickness of the first cathode active material layer to the thickness of the insulating layer is from about 0.2 to about 10.

According to some embodiments of the present application, the coverage of the insulating layer is at least 50%.

According to some embodiments of the present application, the first cathode active material and the second cathode active material are each independently selected from the group consisting of lithium cobaltate, lithium iron phosphate, lithium manganese iron phosphate, sodium iron phosphate, lithium vanadium phosphate, sodium vanadium phosphate, oxy-lithium-vanadium phosphate, oxy-sodium-vanadium phosphate, lithium vanadate, lithium manganate, lithium nickelate, nickel cobalt lithium manganate, lithium-rich manganese-based materials, nickel cobalt lithium aluminate, lithium titanate, and combinations thereof.

According to some embodiments of the present application, the insulating layer includes at least one of inorganic particles and polymers, wherein the inorganic particles are selected from the group consisting of aluminum oxide, silicon dioxide, magnesium oxide, titanium oxide, hafnium dioxide, tin oxide, cerium oxide, nickel oxide, zinc oxide, calcium oxide, zirconium dioxide, yttrium oxide, silicon carbide, boehmite, aluminum hydroxide, magnesium hydroxide, calcium hydroxide, barium sulfate, and combinations thereof, and the polymers are selected from the group consisting of homopolymers of vinylidene fluoride, copolymers of vinylidene fluoride, copolymers of hexafluoropropylene, polystyrene, polyphenylacetylene, sodium poly(vinyl acid), potassium poly(vinyl acid), polyacrylate ester, polyacrylic acids, polyacrylonitrile, polyvinylpyrrolidone, polyvinylether, polymethyl methacrylate, polyethylene, polypropylene, polytetrafluoroethylene, and combinations thereof.

According to some embodiments of the present application, the first cathode active material layer and the second cathode active material layer each independently include a binder and a conductive agent, the binder is selected from the group consisting of polyvinylidene fluoride, copolymers of vinylidene fluoride and hexafluoropropylene, polyamides, polyacrylonitrile, polyacrylate ester, polyacrylic acids, polyacrylate salt sodium carboxymethylcellulose, polyvinylpyrrolidone, polyvinylether, polymethylmethacrylate, polytetrafluoroethylene, polyhexafluoropropylene, styrene butadiene rubber, and combinations thereof, and the conductive agent is selected from the group consisting of carbon nanotubes, conductive carbon black, acetylene black, graphene, Ketjen black, carbon fiber, and combinations thereof.

Some embodiments of the present application provide an electronic device including the electrochemical device in the above embodiments.

BRIEF DESCRIPTION OF THE DRAWINGS

Hereinafter, the drawings necessary to describe the embodiments of the present application or the prior art will be briefly described in order to facilitate the description of the embodiments of the present application. It is obvious that the drawings in the following description are only some of the embodiments in the present application. For those skilled in the art, drawings of other embodiments can still be obtained according to the structure illustrated in these drawings without the need for creative labor.

DETAILED DESCRIPTION

Figure 1A:
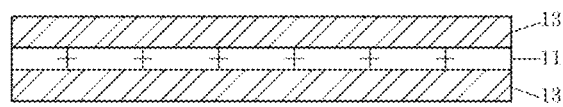
FIG. 1A is a structure diagram of a cathode of a single cathode active material layer structure according to the prior art.

Embodiments of the present application are described below in detail. Throughout the entire specification of this application, same or similar components or components having same or similar functions are represented by using similar reference numerals. The embodiments related to the accompanying drawings that are described herein are illustrative and schematic, and are used to provide basic understanding for this application. The embodiments of this application should not be construed as limitations to this application.

In this specification, unless otherwise particularly indicated or limited, relativistic wordings such as "central", "longitudinal", "lateral", "front", "back", "right", "left", "inner", "outer", "relatively low", "relatively high", "horizontal", "vertical", "higher than", "lower than", "above", "below", "top", "bottom", and derived wordings thereof (such as "horizontally", "downward", and "upward") should be construed as referenced directions described in discussion or shown in the accompanying drawings. These relativistic wordings are merely for ease of description, and do not require constructing or operating this application in a particular direction.

In addition, amounts, ratios and other numerical values are sometimes presented herein in a range format. It should be understood that such range formats are for convenience and brevity, should be interpreted with flexibility, and include not only those numerical values which are specifically designated as being limited in scope, but also include all individual numerical values or sub-ranges which are within the range, as if specifically designating each numerical value and sub-range.

Moreover, for ease of description, "first", "second", "third" and the like may be used herein to distinguish different components of one diagram or a series of diagrams. Unless specifically specified or defined, "first", "second", "third" and the like are not intended to describe corresponding components.

As used herein, the term "about" is used for describing and explaining a small variation. When being used in combination with an event or a case, the terms can refer to an example in which the event or case exactly occurs, or an example in which the event or case similarly occurs. For example, when being used in combination with a value, the terms may refer to a variation range being less than or equal to +10% of the value, for example, less than or equal to +5%, less than or equal to +4%, less than or equal to +3%, less than or equal to +2%, less than or equal to +1%, less than or equal to +0.5%, less than or equal to +0.1%, or less than or equal to +0.05%. In addition, amounts, ratios, and other numerical values are sometimes presented herein in a range format. It should be understood that such range formats are for convenience and brevity, and should be interpreted with flexibility, and include not only those numerical values that are specifically designated as range limitations, but also include all individual numerical values or sub-ranges that are within the range, as each value and sub-range is specified explicitly.

The embodiment of the present application provides an electrochemical device (such as a lithium ion battery), a cathode of which adopts active material layers with a double-layer structure in the region covered by cathode active material layers and is provided with an insulating layer in the region not covered by any cathode active material layer, so that the contact resistance between a cathode current collector and an anode active material layer can be effectively improved when the electrochemical device is damaged by an external force, thereby improving the safety performance of the lithium ion battery in a corresponding test (i.e., nail piercing test).

Four types of short-circuit events commonly occur in the lithium ion battery during a nail piercing test: a cathode active material layer to an anode active material layer, a cathode active material layer to an anode current collector, a cathode current collector to an anode current collector, and a cathode current collector to an anode active material layer. Among the four short-circuit events, the cathode current collector to an anode active material layer is the most dangerous one because the power of the short-circuit is very high when this type of short-circuit event occurs.

The lithium ion battery includes a cathode, an anode, a separator, an electrolyte and the like. The anode includes an anode current collector and an anode active material layer coating the anode current collector. The cathode includes a cathode current collector, cathode active material layers, etc. The cathode current collector includes a surface facing the anode active material layer, i.e., a region covered by the cathode active material layers, and a surface that is not facing the anode active material layer and including an external region of an electrode assembly and an internal tab welded region of the electrode assembly, and the surface, that is not facing the anode active material layer, of the cathode current collector is not covered by any cathode active material layer, and is also called an uncovered foil region. In the region covered by the cathode active material layers, the protection of the cathode current collector can be realized by coating with two cathode active material layers. However, under the nail piercing test, the uncovered foil region of the cathode current collector will also make direct contact with a nail, and the nail will conduct the anode active material layer inside the electrode assembly, thus creating a short-circuit event with the cathode current collector-anode active material layer or cathode current collector-nail-anode active material layer.

In order to ensure that the lithium ion battery does not burn out and fail under the nail piercing test, both the region, covered by the cathode active material layers, of the cathode current collector and the uncovered foil region of the cathode current collector need to be protected. According to the lithium ion battery provided by some embodiments of the present application, by combining the double cathode active material layers with the insulating layer arranged in the uncovered foil region, the region, covered by the cathode active material layers, of the cathode current collector and the uncovered foil region of the cathode current collector are protected, which can effectively improve the contact resistance between the cathode current collector and the nail, and further improve the safety performance of the lithium ion battery in the nail piercing test. When there are only the double cathode active material layers, the possibility that the lithium ion battery fails after being pierced when battery capacity is high still exists. When there is only the insulating layer in the uncovered aluminum foil region on the outer region of the electrode assembly, the lithium ion battery might fail as well under the nail piercing test. Only by combining the two implementations can the lithium ion battery have a 100% pass rate in the nail piercing test.

Figure 1B:
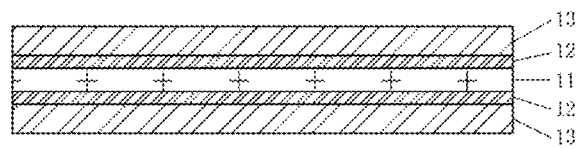
FIG. 1B is a structure diagram of a cathode according to some embodiments of the present application.

The technical advantages of the double cathode active material layers over a cathode with a single-layer structure will be described below with reference to FIG. 1A and FIG. 1B. FIG. 1A is a structure diagram of a cathode with a single-layer structure according to the prior art. FIG. 1B is a structure diagram of a cathode according to some embodiments of the present application.

As shown in FIG. 1A, the cathode provided with a single cathode active material layer has a cathode current collector 11 located between two parts of the cathode active material layer 13. FIG. 1B shows double cathode active material layers according to some embodiments of the present application, that is, an additional cathode active material layer 12 is formed between the cathode active material layer 13 and the cathode current collector 11, wherein the cathode active material layer 12 directly contacts the cathode active material layer 13 and the cathode current collector 11. For better distinction, the cathode active material layer 12 is hereinafter referred to as a first cathode active material layer and the cathode active material layer 13 is referred to as a second cathode active material layer, which is only for better description and therefore does not limit the present application.

Compared with the traditional single cathode active material layer 13, the combination of the first cathode active material layer 12 and the second cathode active material layer 13 can not only improve the pass rate of the lithium ion battery in the nail piercing test, but also improve the compaction density of the cathode, mainly because the first cathode active material layer 12 has a high binder content and a first cathode active material of a small particle size. By optimizing the material and formula of the first cathode active material layer 12, i.e., high binder content and the first cathode active material with a small particle size, the bonding force between the first cathode active material layer 12 and the cathode current collector 11 is increased, so that the first cathode active material layer 12 and the cathode current collector 11 are tightly bonded together, thereby ensuring the first cathode active material layer 12 cannot be disengaged during the nail piercing process, as a result, a short-circuit event of the cathode current collector to the anode active material layer or the cathode current collector to the nail to the anode active material layer does not occur during the nail piercing process, thereby ensuring the safety performance of the lithium ion battery. Due to the high resistance of the first cathode active material layer 12, the energy released during a short-circuit between the cathode active material layers and the anode active material layer in the lithium ion battery can be reduced, resulting in a significant improvement during the nail piercing test of the lithium ion battery. In addition, since the first cathode active material layer 12 is thin and the second cathode active material layer 13 has a normal binder content (lower than the binder content in the first cathode active material layer), the high-resistance characteristic of the first cathode active material layer 12 has little influence on the performance of the lithium ion battery, such as the resistance value of the lithium ion battery. On the contrary, if the cathode with a single-layer structure has a high binder content, the safety performance of the cathode can be improved, but the high binder content will lead to an increase in the resistance of the whole cathode active material layer, thus resulting in a very large resistance value of the lithium ion battery and affecting the discharge performance of the lithium ion battery; at the same time, the content of the cathode active material decreases due to an increase in the binder content, thus reducing the energy density of the lithium ion battery.

Compared with the case that a layer of non-conductive or poorly conductive non-active material is used as a coating between the cathode current collector and the cathode active material layer, the present application in which the first cathode active material layer and the second cathode active material layer contain the first cathode active material and the second cathode active material respectively allows both the first and second cathode active material layers to provide energy, thus having a higher energy density.

Figure 2A:
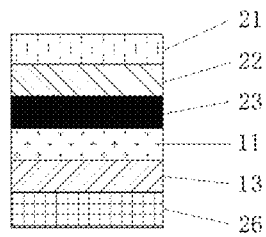
FIG. 2A is a diagram of a lithium ion battery with a wound electrode assembly according to the prior art.
Figure 2A:
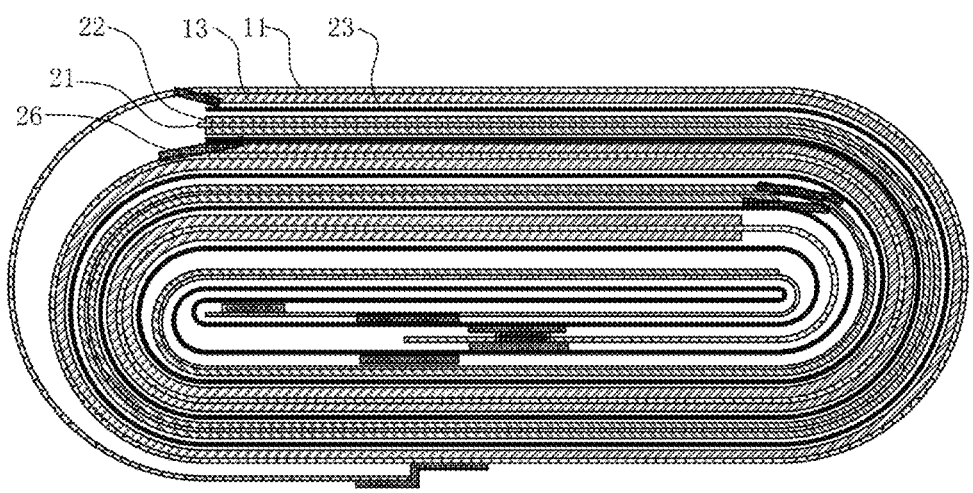
Figure 2B:
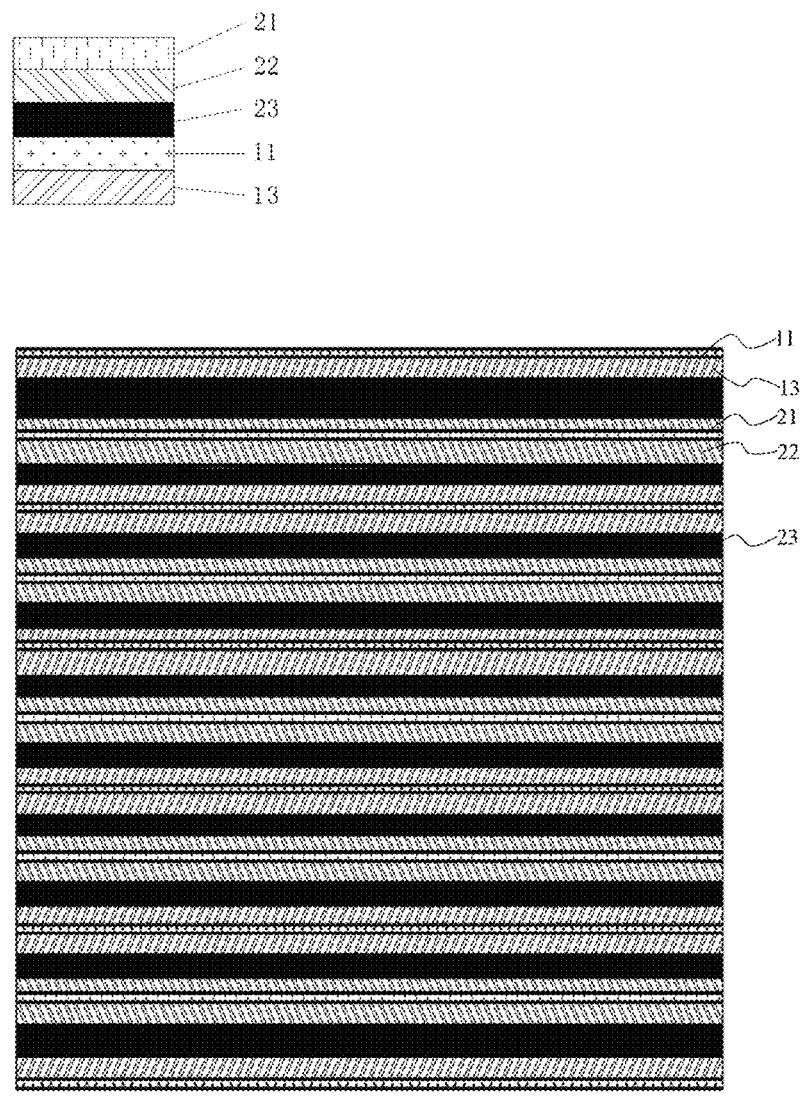
FIG. 2B is a diagram of a lithium ion battery with a laminated electrode assembly according to the prior art.
Figure 3A:
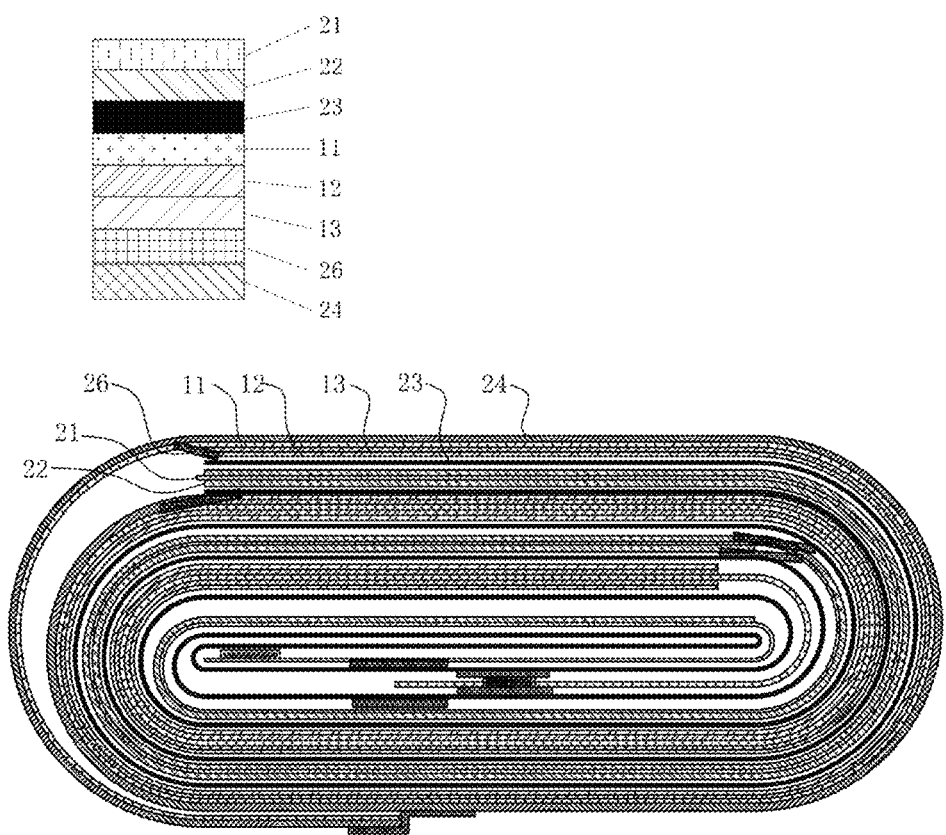
FIG. 3A is a diagram of a lithium ion battery with a wound electrode assembly according to some embodiments of the present application.
Figure 3B:
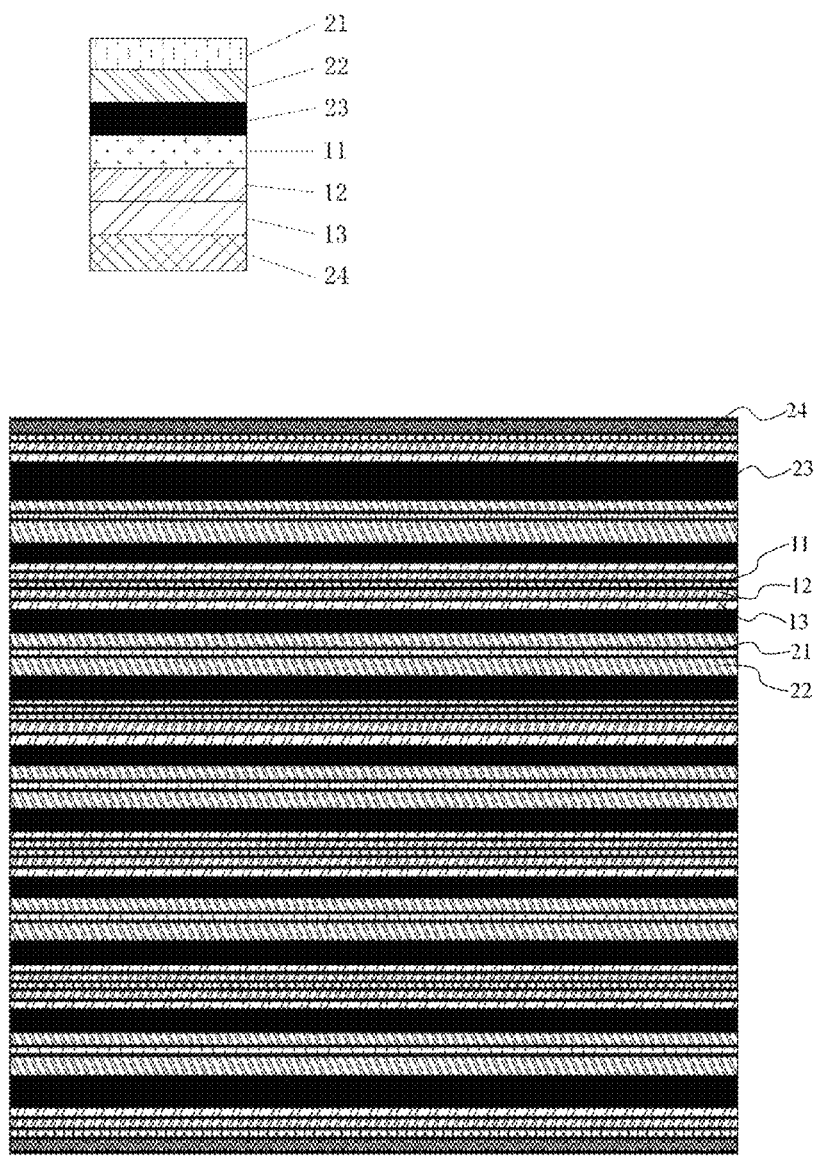
FIG. 3B is a diagram of a lithium ion battery with a laminated electrode assembly according to some embodiments of the present application.

FIG. 2A and FIG. 2B are diagrams of lithium ion batteries with a wound electrode assembly and a laminated electrode assembly according to the prior art. FIG. 3A and FIG. 3B are diagrams of lithium ion batteries with a wound electrode assembly and a laminated electrode assembly according to some embodiments of the present application.

As shown in FIG. 2A and FIG. 2B, the lithium ion battery with the wound electrode assembly or laminated electrode assembly according to the prior art includes a cathode, a separator 23 and an anode, wherein the cathode includes a cathode current collector 11 and a cathode active material layer 13, and the anode includes an anode current collector 21 and an anode active material layer 22. FIG. 2A is a structure diagram of a lithium ion battery with a wound electrode assembly, the cathode current collector 11 includes a region covered by the cathode active material layer 13 (i.e., a surface facing the anode active material layer) and an uncovered foil region (i.e., a surface is not facing the anode active material layer), and the uncovered foil region includes a tab welded region inside the electrode assembly, a double-side uncovered foil region outside the electrode assembly with neither side covered by the cathode active material, and a single-side uncovered foil region outside the electrode assembly with its opposite side covered by the cathode active material layer 13, wherein the cathode current collector 11 at the extreme end of the double-side uncovered foil region and the cathode active material layer 13 at the extreme end of the region covered by the cathode active material layer 13 are attached and fixed by an adhesive film 26. FIG. 2A and FIG. 2B both show that in the conventional lithium ion battery with a wound or laminated electrode assembly, the cathode active material layer 13 on the surface, facing the anode active material layer 22, of the cathode current collector 11 is of a single-layer structure, and the surface (uncovered foil region), that is not facing the anode active material layer 22, of the cathode current collector 11 is not covered by the cathode active material layer 13. In a nail piercing test, the lack of protection of the uncovered foil region of the cathode current collector 11 results in extremely low short-circuit resistance of a short-circuit mode of the cathode current collector-anode active material layer or the cathode current collector-nail-anode active material layer, thus causing the lithium ion battery to fail and catch fire.

Some embodiments of the present application provide a lithium ion battery, and as shown in FIG. 3A and FIG. 3B, the lithium ion battery includes a cathode, a separator 23 and an anode, wherein the cathode includes a cathode current collector 11, cathode active material layers and an insulating layer 24, and the anode includes an anode current collector 21 and an anode active material 22. There are two cathode active material layers on the surface, facing the anode active material layer 22, of the cathode current collector 11, that is, a first cathode active material layer 12 and a second cathode active material layer 13, the first cathode active material layer 12 is disposed between the cathode current collector 11 and the second cathode active material layer 13, and the first cathode active material layer 12 is formed on the surface, facing the anode active material layer 22, of the cathode current collector 11, that is, a region covered by the cathode active material layers. In addition, the insulating layer 24 is disposed on a surface, which is not facing the anode active material layer 22, of the cathode current collector 11. In a nail piercing test, since the region covered by the cathode active material layer 13 (i.e., the surface facing the anode active material layer 22) and the uncovered foil region (i.e., the surface is not facing the anode active material layer 22) of the cathode current collector 11 of the lithium ion battery are protected by the combination of the first cathode active material layer 12 and the second cathode active material layer 13 as well as the insulating layer 24 respectively, it is relatively difficult to form a short-circuit event with the cathode current collector-anode active material layer or the cathode current collector-nail-anode active material layer in the lithium ion battery. Even if a short circuit is formed, short-circuit resistance increases, thereby improving the safety performance of the lithium ion battery.

In some embodiments of the present application, as shown in FIG. 3A, the electrode assembly of the lithium ion battery is of a wound structure, wherein the cathode current collector 11 includes a region covered by the cathode active material layer 13 (i.e., a first surface facing the anode active material layer) and a uncovered foil region (i.e., a second surface is not facing the anode active material layer), and the uncovered foil region includes a single-side uncovered foil region outside the electrode assembly with its opposite side covered by the cathode active material layer, a double-side uncovered foil region outside the electrode assembly with neither side covered by the cathode active material, and a tab welded region inside the electrode assembly.

Figure 4A:
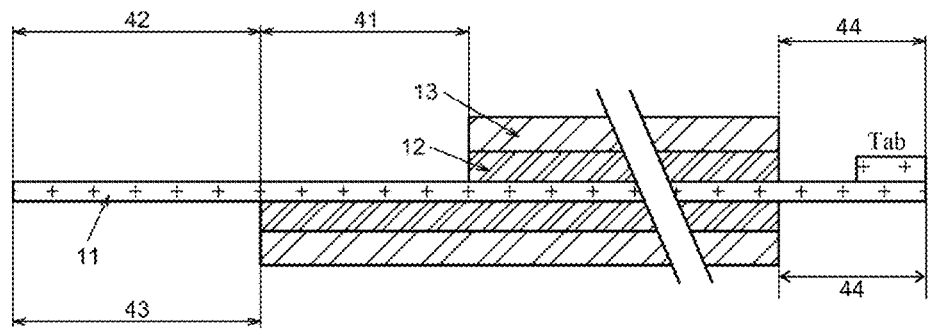
FIG. 4A is a structure diagram of a cathode without an insulating layer in a wound electrode assembly unwound in the length direction of a cathode current collector according to some embodiments of the present application.

FIG. 4A is a structure diagram of a cathode without an insulating layer in a wound electrode assembly unwound in the length direction of a cathode current collector according to some embodiments of the present application. Hereinafter, the arrangement of the uncovered foil region and the insulating layer of the wound electrode assembly will be described with reference to FIG. 4A and FIG. 4B. As shown in FIG. 4A, after the cathode without the insulating layer in the wound electrode assembly is unwound, the surface of the cathode current collector 11 includes a cathode active material layer covering region 11A covered by the first cathode active material layer 12 and the second cathode active material layer 13, wherein the first cathode active material layer is directly disposed on the cathode active material layer covering region of the surface of the cathode current collector, and uncovered foil regions 11B and 11C not covered by the first cathode active material layer 12 or the second electrode active material layer 13. The uncovered foil region 11B includes a first uncovered foil region 41 and second uncovered foil region 42 located outside the cathode electrode assembly, and the uncovered foil region 11C includes a third uncovered foil region 44 located inside the cathode electrode assembly, wherein the first uncovered foil region 41 is a single-side uncovered foil region with its opposite side covered by the cathode active material layer, the second uncovered foil regions 42 and 43 are double-side uncovered foil regions with neither side covered by the cathode active material and include an outer second uncovered foil region 42 on the same side surface as the first uncovered foil region (i.e., the surface facing outward from the electrode assembly) and an inner second uncovered foil region 43 on the other side surface (i.e., the surface facing inward from the electrode assembly), and the third uncovered foil region 44 is a tab welded region inside the electrode assembly. The cathode active material layer covering region 11A corresponds to a first region of a surface of the cathode. The uncovered foil region 11B corresponds to a second region of the surface of the cathode current collector.

Figure 4B:
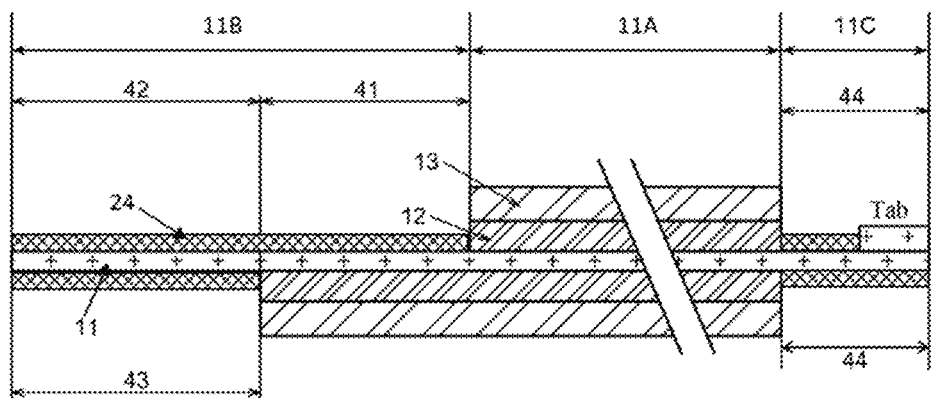
FIG. 4B is a structure diagram of a cathode with an insulating layer in a wound electrode assembly unwound in the length direction of a cathode current collector according to some embodiments of the present application.

FIG. 4B is a structure diagram of a cathode with an insulating layer in a wound electrode assembly unwound in the length direction of a cathode current collector according to some embodiments of the present application. As shown in FIG. 4B, in some embodiments of the present application, the insulating layers 24 may be disposed on the uncovered foil region 11B of the surface of the cathode current collector and the uncovered foil region 11C of the surface of the cathode current collector. The uncovered foil region 11B of the surface of the cathode collector 11 includes the first uncovered foil region 41 located as an outer winding portion of the electrode assembly, wherein the opposite side of the first uncovered foil region 41 is covered by a third cathode active material layer, wherein the third cathode active material layer disposed on the opposite side of the cathode current collector from the first cathode active material layer and the second cathode active material layer, and the second uncovered foil region 42 located as the outer winding portion of the electrode assembly, wherein the opposite side of the second uncovered foil region is not covered by a cathode active material layer. The insulating layer 24 is fully extended over the first uncovered foil region 41. The uncovered foil region 11C of the surface of the cathode collector 11 includes the third uncovered foil region 44, wherein the third uncovered foil region 44 is located as an inner winding portion of the electrode assembly.

In some embodiments of the present application, the insulating layer 24 is disposed at least in the first uncovered foil region 41.

In some embodiments of the present application, the first cathode active material has a small particle size, thereby enabling an increased coverage and adhesion to the cathode current collector 11. The particle size of the cathode active material can be measured by a Malvern particle size analyzer: the cathode active material is dispersed in a dispersant (ethanol or acetone, or other surfactants), and after ultrasonic treatment for 30 mins, a sample is added to the Malvern particle size analyzer to start the test. The first cathode active material has a particle size (Dv50), which accounts for 50% of the cumulative volume of the small particle size side in volume-based particle size distribution, of from about 0.2 µm to about 15 µm, and a particle size (Dv90), which accounts for 90% of the cumulative volume of the small particle size side in volume-based particle size distribution, of less than or equal to about 40 µm. In order to ensure the protection effect on the cathode current collector 11, the first cathode active material layer 12 needs to increase the coverage of its coverage region, which is the percentage of the difference obtained after the total coating area of the region to be coated minus the exposed area of the layer to be coated exposed through holes in the coating layer in the total coating area. In addition, the smaller the particle size of the first cathode active material is, the thinner the first cathode active material layer can be made.

In some embodiments of the present application, in order to prevent the second cathode active material in the second cathode active material layer from damaging the first cathode active material layer during cold pressing and to ensure maximum adhesion between the first cathode active material layer and the second cathode active material layer, a ratio of the average particle size (Dv50) of the second cathode active material to the average particle size (Dv50) of the first cathode active material is from about 1:1 to about 40:1.

In some embodiments of the present application, the first cathode active material layer 12 needs to be thick enough to ensure the adhesion between the first cathode active material layer 12 and the second cathode active material layer 13. For this purpose, the particle size of the first cathode active material has an upper limit. Since the particle size of the cathode active material in the first cathode active material layer 12 is small and the first cathode active material layer 12 contains more binder than the second cathode active material layer 13, the first cathode active material layer 12 cannot be too thick, otherwise the energy density of the lithium ion battery will be reduced, and since the first cathode active material layer 12 needs to achieve a certain coverage on the cathode current collector 11, the thickness of the first cathode active material layer 12 needs to be controlled to be from about 3 to about 40 µm, and the thickness after cold pressing is from about 0.5 µm to about 15 µm. In particular, the thickness of the first cathode active material layer 12 is not less than Dv50 of the first cathode active material in order to ensure the coverage of the first cathode active material layer 12. Since the first cathode active material has a small particle size, its compaction density will be relatively low. Therefore, to achieve a high energy density of the lithium ion battery, the thickness of the second cathode active material layer 13 needs to be increased, which is from about 30 µm to about 1000 µm. The thicker the second cathode active material layer 13, is the higher the energy density of the lithium ion battery can be made.

According to some embodiments of the present application, a ratio of the thickness of the first cathode active material layer 12 to the thickness of the insulating layer 24 also affects the performance of the lithium ion battery in the nail piercing test. With the increase of battery capacity, the short-circuit power also increases when the lithium ion battery is short-circuited, which means that the energy released by a short-circuit of the lithium ion battery increases. The short circuit between the cathode active material layer and the anode current collector and the short circuit between the cathode current collector and the anode current collector share the release of this energy. The short-circuit power is inversely proportional to the short-circuit resistance (power=voltage/(square of resistance)). Since the nail will penetrate through the lithium ion battery in the nail piercing test, short circuits will be formed in the uncovered foil region outside the electrode assembly and the cathode active material layer coverage region, both of which jointly share the energy of the whole lithium ion battery. When the short-circuit resistance of one short circuit is high, its share of energy is very low, while when the resistance of the other short circuit is low, much energy needs to be released, resulting in high energy at a local short-circuit point. When the local short-circuit power reaches a certain value, the lithium-ion battery will burn and fail. The thickness of the first cathode active material layer 12 and the thickness of the insulating layer 24 are the main parameters affecting the short-circuit resistance of the corresponding cathode active material layer coverage region and the uncovered foil region of the cathode current collector 11. If the ratio of the thickness of the first cathode active material layer 12 to the thickness of the insulating layer 24 is too high, it means that the resistance of the first cathode active material layer 12 is much higher, then most of the energy of the lithium ion battery will be released in a short time through the short circuit between the uncovered foil region of the cathode current collector and the anode active material layer, which tends to cause the lithium ion battery to fail. If the ratio of the thickness of the first cathode active material layer 12 to the thickness of the insulating layer 24 is too low, most of the energy of the lithium ion battery will be released in a short time through the short circuit between the first cathode active material layer 12 and the anode active material layer 22. When the energy of the lithium ion battery accumulates to a certain value, the temperature of the lithium ion battery rises to the critical point of combustion, and the lithium ion battery will burn and fail. In some embodiments of the present application, the ratio of the thickness of the first cathode active material layer 12 to the thickness of the insulating layer 24 is from about 0.2 μm to about 10 μm, and the short-circuit power of the lithium ion battery in the nail piercing testis relatively average, the situation that local energy is too high will not occur, and the safety performance of the lithium ion battery in the nail piercing testis optimal.

According to some embodiments of the present application, the coverage of the insulating layer is another factor which affects the safety performance of the nail piercing test. If the coverage is too low and part of the uncovered foil region of the cathode current collector is exposed, a decrease in the cathode current collector resistance of the insulating layer will be caused, resulting in an increase in the short-circuit power on the surface, that is not facing the anode active material layer, of the cathode current collector in the nail piercing test, and then the lithium ion battery will fail. In some embodiments of the present application, the coverage of the insulating layer needs to be greater than or equal to about 50%. The coverage is the percentage of the difference obtained after the total coating area of the region to be coated minus the exposed area of the layer to be coated exposed through holes in the coating layer in the total coating area.

According to some embodiments of the present application, the insulating layer includes at least one of inorganic particles and polymers, and a suitable dispersant may also be added, and the dispersant includes, but is not limited to, ethanol or acetone, or other surfactants. The inorganic particles are selected from the group consisting of aluminum oxide, silicon dioxide, magnesium oxide, titanium oxide, hafnium dioxide, tin oxide, cerium dioxide, nickel oxide, zinc oxide, calcium oxide, zirconium dioxide, yttrium oxide, silicon carbide, boehmite, aluminum hydroxide, magnesium hydroxide, calcium hydroxide, barium sulfate, and combinations thereof, and the polymers are selected from the group consisting of homopolymers of vinylidene fluoride, copolymers of vinylidene fluoride, copolymers of hexafluoropropylene, polystyrene, polyphenylacetylene, sodium poly(vinyl acid), potassium poly(vinyl acid), polyacrylate ester, polyacrylic acids, polyacrylonitrile, polyvinylpyrrolidone, polyvinylether, polymethyl methacrylate, polyethylene, polypropylene, polytetrafluoroethylene, and combinations thereof.

According to some embodiments of the present application, the first cathode active material and the second cathode active material are each independently selected from the group consisting of lithium cobaltate, lithium iron phosphate, lithium manganese iron phosphate, sodium iron phosphate, lithium vanadium phosphate, sodium vanadium phosphate, oxy-lithium-vanadium phosphate, oxy-sodium-vanadium phosphate, lithium vanadate, lithium manganate, lithium nickelate, nickel cobalt lithium manganate, lithium-rich manganese-based materials, nickel cobalt lithium aluminate, lithium titanate, and combinations thereof.

In some embodiments of the present application, the first cathode active material layer 12 and the second cathode active material layer 13 each independently include a binder, and the binder includes, but is not limited to, one of polyvinylidene fluoride, copolymers of vinylidene fluoride and hexafluoropropylene, polyamides, polyacrylonitrile, polyacrylate ester, polyacrylic acids, polyacrylate salt, sodium carboxymethylcellulose, polyvinylpyrrolidone, polyvinylether, polymethylmethacrylate, polytetrafluoroethylene, polyhexafluoropropylene, styrene butadiene rubber, and combinations thereof. On one hand, the binder enables the active material layers and the cathode current collector to be better bonded; on the other hand, as the binder content increases, the compaction density of the first cathode active material layer 12 decreases. The binder in the first cathode active material layer 12 accounts for from about 1.5% to about 6%, by weight, of the total weight of the first cathode active material layer 12, and the binder in the second cathode active material layer 13 accounts for from about 0.5% to about 4%, by weight, of the total weight of the second cathode active material layer 13.

In some embodiments of the present application, the content of the binder of the first cathode active material layer 12 is greater than that of the binder of the second cathode active material layer 13, thereby ensuring the bonding force between the first cathode active material layer 12 and the current collector 11 and also avoiding the occurrence of the short-circuit event of cathode current collector-anode active material layer or cathode current collector-nail-anode active material layer in the nail piercing test. In addition, since the binder content of the first cathode active material layer 12 is high, the first cathode active material layer 12 also has a high impedance property. The short-circuit resistance is high and the short-circuit power is low during nail piercing, so that thermal runaway of the electrode assembly can be prevented.

In some embodiments of the present application, the first cathode active material layer 12 and the second cathode active material layer 13 contain a certain amount of conductive agent. The conductive agent includes, but is not limited to, one of carbon nanotubes, conductive carbon black, acetylene black, graphene, Ketjen black, carbon fiber, and combinations thereof. The conductive agent in the first cathode active material layer accounts for about 0.5% to about 5%, by weight, of the total weight of the first cathode active material layer, and the conductive agent in the second cathode active material layer accounts for about 0.5% to about 5%, by weight, of the total weight of the second cathode active material layer.

In addition, the first cathode active material layer 12 or the second cathode active material layer 13 may be subjected to some other treatment, or the cathode current collector 11 may be subjected to some treatment, such as roughness treatment and heat treatment, the principle or effect thereof may be to enhance the adhesion to the current collector. Although it is not described in detail in the present application, it is included in the scope of the present application.

The cathode current collector of the cathode in some embodiments of the present application may be aluminum foil or nickel foil, and the anode current collector of the anode may be copper foil or nickel foil, however, other cathode current collectors and anode current collectors commonly used in the art may be used.

The conductive agent and binder of the anode active material layer are similar to those of the cathode active material layer described above and will not be described here. The anode active material layer includes an anode active material including, but not limited to, one selected from the group consisting of carbon materials, metal compounds, oxides, sulfides, nitrides of lithium such as $LiN_3$, lithium metals, metal elements and semi-metal elements which form alloys with lithium, polymer materials, and combinations thereof.

Among the above anode active materials, examples of the carbon materials may include low-graphitized carbon, easily graphitized carbon, artificial graphite, natural graphite, mesocarbon microbeads, soft carbon, hard carbon, pyrolyzed carbon, coke, glassy carbon, organic polymer compound sintered body, carbon fiber, and activated carbon. Coke may include pitch coke, needle coke and petroleum coke. The organic polymer compound sintered body refers to a material obtained by calcining a polymer material such as phenol plastic or furan resin at an appropriate temperature for carbonization, and some of these materials are divided into low-graphitized carbon or easily graphitized carbon. Examples of polymer materials may include polyacetylene and polypyrrole.

In the above anode active material, further, a material whose charge and discharge voltages are close to those of lithium metal is selected. This is because the lower the charge and discharge voltages of the anode active material are, the easier it is for the battery to have a higher energy density. The anode active material can be selected from carbon materials because their crystal structure changes only slightly during charging and discharging, so a good cycle characteristic and large charging and discharging capacity can be obtained. In particular, graphite can be selected because it can provide a large electrochemical equivalent and a high energy density.

In addition, the anode active material may include elemental lithium metal, metal elements and semi-metal elements capable of forming alloys with lithium (Li), alloys and compounds including such elements, and the like. In particular, they are used together with the carbon materials because in this case, a good cycle characteristic and a high energy density can be obtained. In addition to alloys including two or more metal elements, alloys used herein also include alloys including one or more metal elements and one or more semi-metal elements. The alloys may be solid solutions, eutectics (eutectic mixtures), intermetallic compounds and mixtures thereof in the following states.

Examples of the above metal elements and semi-metal elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of the above alloys and compounds may include materials having the chemical formula: $Ma_sMb_qLi_u$ and materials having the chemical formula: $Ma_pMc_qMd_r$. In these chemical formulas, Ma represents at least one of a metal element and a semi-metal element capable of forming an alloy together with lithium; Mb represents at least one of a metal element and a semi-metal element other than lithium and Ma; Mc represents at least one element among non-metallic elements; Md represents at least one of a metal element and a semi-metal element other than Ma; and s, t, u, p, q and r satisfy s>0, t≥0, u≥0, p>0, q>0 and r≥0.

In addition, inorganic compounds excluding lithium (Li), such as $MnO_2$, $V_2O_5$, $V_6O_{13}$, NiS and MoS, may be used in the anode active material layer.

The separator in some embodiments of the present application includes, but is not limited to, at least one selected from polyethylene, polypropylene, polyethylene terephthalate, polyimide, and aramid. For example, polyethylene includes at least one component selected from the group consisting of high density polyethylene, low density polyethylene, and ultra-high molecular weight polyethylene. In particular, polyethylene and polypropylene have a good effect on preventing a short circuit and can improve the stability of the battery through the shutdown effect.

The surface of the separator may further include a porous layer disposed on at least one surface of the separator, the porous layer includes inorganic particles and a binder, and the inorganic particles are selected from one or more of aluminum oxide ($Al_2O_3$), silicon oxide ($SiO_2$), magnesium oxide (MgO), titanium oxide ($TiO_2$), hafnium dioxide ($HfO_2$), tin oxide ($SnO_2$), cerium oxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide and barium sulfate. The binder is selected from one or more of polyvinylidene fluoride, copolymers of vinylidene fluoride and hexafluoropropylene, polyamides, polyacrylonitrile, polyacrylate ester, polyacrylic acids, polyacrylate salt, sodium carboxymethylcellulose, polyvinylpyrrolidone, polyvinylether, polymethylmethacrylate, polytetrafluoroethylene and polyhexafluoropropylene.

The porous layer can improve the heat resistance, oxidation resistance and electrolyte infiltration performance of the separator and enhance the adhesion between the separator and the cathode or the anode.

The electrochemical device of the present application also includes an electrolyte, which may be one or more of a gel electrolyte, solid electrolyte and electrolyte solution, and the electrolyte solution includes lithium salt and a non-aqueous solvent.

In some embodiments of the present application, the lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB and lithium difluoroborate. For example, the lithium salt is $LiPF_6$ because it can provide a high ionic conductivity and improve the cycle characteristic.

The non-aqueous solvent may be a carbonate compound, a carboxylate compound, an ether compound, other organic solvents, or a combination thereof.

The carbonate compound may be a chain carbonate compound, a cyclic carbonate compound, a fluorocarbonate compound, or a combination thereof.

Examples of the above chain carbonate compounds are diethyl carbonate (DEC), dimethyl carbonate (DMC), dipropyl carbonate (DPC), methyl propyl carbonate (MPC), ethyl propyl carbonate (EPC), methyl ethyl carbonate (MEC) and combinations thereof. Examples of the cyclic carbonate compounds are ethylene carbonate (EC), propylene carbonate (PC), butylene carbonate (BC), vinyl ethylene carbonate (VEC), propyl propionate (PP) and combinations thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate and combinations thereof.

Examples of the above carboxylate compounds are methyl acetate, ethyl acetate, n-propyl acetate, tert-butyl acetate, methyl propionate, ethyl propionate, propyl propionate, γ-butyrolactone, decanolide, valerolactone, DL-Mevalonolactone, caprolactone, methyl formate, and combinations thereof.

Examples of the above ether compounds are dibutyl ether, tetraglyme, diglyme, 1,2-dimethoxyethane, 1,2-diethoxyethane, ethoxymethoxyethane, 2-methyltetrahydrofuran, tetrahydrofuran, and combinations thereof.

Examples of the other organic solvents mentioned above are dimethyl sulfoxide, 1,2-dioxolane, sulfolane, methylsulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate esters and combinations thereof.

In some embodiments of the present application, the cathode, the separator, and the anode are sequentially wound or stacked into an electrode assembly, and then packaged in, for example, an aluminum-plastic film, the electrolyte is injected, and then a lithium ion battery is manufactured after formation and packaging. Subsequently, the prepared lithium ion battery is subjected to a performance test, battery capacity test and nail piercing test.

Those skilled in the art will understand that although the lithium ion battery has been exemplified above, the electrochemical device of the present application further includes any other suitable electrochemical device. Without departing from the disclosure of the present application, such electrochemical devices include any devices which undergo an electrochemical reaction, and specific examples thereof include all kinds of primary batteries, secondary batteries, fuel cells, solar cells, or capacitors. In particular, the electrochemical device is a lithium ion battery including a lithium metal secondary battery, a lithium ion secondary battery, a lithium polymer secondary battery, or a lithium ion polymer secondary battery.

The electrochemical device of the present application includes electrochemical devices of different structures, the wound lithium ion battery is used as an example in the embodiment, but the electrochemical device of the present application may include electrochemical devices of a laminated structure and multi-tab structure, all of which are included within the scope of the present application.

The use of the electrochemical device of the present application is not particularly limited and can be for any use known in the art. In one embodiment, the electrochemical device of the present application may be used for, but is not limited to, notebook computers, pen input computers, mobile computers, e-book players, portable telephones, portable fax machines, portable copiers, portable printers, headsets, video recorders, LCD televisions, portable cleaners, portable CD players, mini CDs, transceivers, electronic organizer, calculators, memory cards, portable recorders, radios, standby power supplies, motors, automobiles, motorcycles, booster bicycles, bicycles, lighting fixtures, toys, game machines, clocks, electric tools, flashlights, cameras, large household batteries, lithium ion capacitors, etc.

Some specific embodiments and comparative examples are listed below and subjected to a battery capacity test and nail piercing test, so as to better explain the present application. Those skilled in the art will understand that the preparation methods described in the present application are only exemplary embodiments, and any other suitable preparation method is within the scope of the present application.

Comparative Example 1

Aluminum foil was adopted as a cathode current collector, the surface of the aluminum foil was uniformly coated with a layer of lithium cobaltate slurry, the lithium cobaltate slurry consisting of 97.8 wt % of lithium cobaltate (LCO) (wherein the particle size of lithium cobaltate is Dv50:13 μm, Dv90:38 μm), 0.8 wt % of polyvinylidene fluoride (PVDF) and 1.4 wt % of conductive carbon black, drying was performed at 85° C., then cold pressing, cutting and slitting were performed and drying was performed under 85° C. vacuum conditions for 4 hours to obtain a cathode, the cold pressing pressure being 60 T and the cold pressing speed being 40 m/min. The thickness of the cathode active material layer was 63 μm.

Copper foil was adopted as an anode current collector, surface of the copper foil was uniformly coated with a layer of graphite slurry, the slurry consisting of 97.7 wt % of artificial graphite, 1.3 wt % of sodium carboxymethylcellulose (CMC) and 1.0 wt % of styrene butadiene rubber (SBR), drying was performed at 85° C., then cold pressing, cutting and slitting were performed and drying was performed under 85° C. vacuum conditions for 4 hours to obtain an anode.

A solution of lithium salt $LiPF_6$ and a non-aqueous organic solvent (ethylene carbonate (EC):diethyl carbonate (DEC):propylene carbonate (PC):propylene propionate (PP):vinylene carbonate (VC)=20:30:20:28:2 by mass) mixed in a ratio of 8:92 by mass was used as an electrolyte for a lithium ion battery.

The cathode and the anode were wound, and the cathode and the anode were separated by a polyethylene separator, so that a wound electrode assembly was prepared. The electrode assembly was subjected to top-side sealing, code spraying, vacuum drying, electrolyte injection, high-temperature standing and then chemical formation and packaging to generate a finished lithium ion battery.

Comparative Example 2

Aluminum foil was used as a cathode current collector, the surface of the aluminum foil was uniformly coated with a layer of small-particle lithium iron phosphate slurry, and a first cathode active material was included, wherein the particle size of lithium iron phosphate was Dv50:3 μm and Dv90:10 μm. The lithium iron phosphate slurry consisted of 95.6 wt % of lithium iron phosphate ($LiFePO_4$), 3.0 wt % of polyvinylidene fluoride (PVDF) and 1.4 wt % of conductive carbon black, a first cathode active material layer with a thickness of 5 μm was formed, drying was performed at 85° C., then cold pressing was performed with the cold pressing pressure of 40 T and the cold pressing speed of 40 m/min. The cold-pressed first cathode active material layer was coated with a layer of lithium cobaltate slurry consisting of 97.8 wt % of lithium cobaltate (LCO) (wherein the particle size of lithium cobaltate is Dv50:13 μm, Dv90:38 μm), 0.8 wt % of polyvinylidene fluoride (PVDF) and 1.4 wt % of conductive carbon black, the total mass of the two active material layers being equal to that of the active material in example 1, drying was performed at 85° C., then cold pressing, cutting and slitting were performed and drying was performed under 85° C. vacuum conditions for 4 hours to obtain a cathode, the cold pressing pressure being 60 T and the cold pressing speed being 40 m/min.

Copper foil was adopted as an anode current collector, the surface of the copper foil was uniformly coated with a layer of graphite slurry, the slurry consisting of 97.7 wt % of artificial graphite, 1.3 wt % of sodium carboxymethylcellulose (CMC) and 1.0 wt % of styrene butadiene rubber (SBR), drying was performed at 85° C., then cold pressing, cutting and slitting were performed and drying under 85° C. vacuum conditions for 4 hours to obtain an anode.

A solution of lithium salt $LiPF_6$ and a non-aqueous organic solvent (ethylene carbonate (EC):diethyl carbonate (DEC):propylene carbonate (PC):propylene propionate (PP):vinylene carbonate (VC)=20:30:20:28:2 by mass) mixed in a ratio of 8:92 by mass was used as an electrolyte for a lithium ion battery.

The cathode and the anode were wound, and the cathode and the anode were separated by a polyethylene separator, so that a wound electrode assembly was prepared. The electrode assembly was subjected to top-side sealing, code spraying, vacuum drying, electrolyte injection, high-temperature standing and then chemical formation and packaging to generate a finished lithium ion battery.

Comparative Example 3

Aluminum foil was adopted as a cathode current collector, and the surface of the aluminum foil was uniformly coated with a layer of lithium cobaltate slurry consisting of 97.8 wt % of lithium cobaltate (LCO) (wherein the particle size of lithium cobaltate is Dv50:13 μm, Dv90:38 μm), 0.8 wt % of polyvinylidene fluoride (PVDF) and 1.4 wt % of conductive carbon black. After the was dried, a first uncovered foil region of an electrode assembly (a single-side uncovered foil region outside the electrode assembly with its opposite side covered by a cathode active material layer) was coated with a layer of insulating layer slurry, the slurry consisted of 10% of polyvinylidene fluoride and 90% of aluminum oxide particles, the coating thickness was 5 μm, and the coating speed was controlled to ensure that the coverage of the coating region was more than or equal to 90%. After coating, drying was performed, then cold pressing, cutting and slitting were performed and drying was performed under 85° C. vacuum conditions for 4 hours to obtain a cathode, the cold pressing pressure being 60 T and the cold pressing speed being 40 m/min.

Copper foil was adopted as an anode current collector, the surface of the copper foil was uniformly coated with a layer of graphite slurry, the graphite slurry consisting of 97.7 wt % of artificial graphite, 1.3 wt % of sodium carboxymethylcellulose (CMC) and 1.0 wt % of styrene butadiene rubber (SBR), drying was performed at 85° C., then cold pressing, cutting and slitting were performed and drying was performed under 85° C. vacuum conditions for 4 hours to obtain an anode.

A solution of lithium salt $LiPF_6$ and a non-aqueous organic solvent (ethylene carbonate (EC):diethyl carbonate (DEC):propylene carbonate (PC):propylene propionate (PP):vinylene carbonate (VC)=20:30:20:28:2 by mass) mixed in a ratio of 8:92 by mass was used as an electrolyte for a lithium ion battery.

The cathode and the anode were wound, and the cathode and the anode were separated by a polyethylene separator, so that a wound electrode assembly was prepared. The electrode assembly was subjected to top-side sealing, code spraying, vacuum drying, electrolyte injection, high-temperature standing and then chemical formation and packaging to generate a finished lithium ion battery.

Example 1

Aluminum foil was used as a cathode current collector, the surface of the aluminum foil was uniformly coated with a layer of small-particle lithium iron phosphate slurry, and a first cathode active material was included, wherein the particle size of lithium iron phosphate was Dv50:3 μm and Dv90:10 μm. The lithium iron phosphate slurry consisted of 95.6 wt % of lithium iron phosphate ($LiFePO_4$), 3.0 wt % of polyvinylidene fluoride (PVDF) and 1.4 wt % of conductive carbon black, a first cathode active material layer with a thickness of 5 μm was formed, and drying was performed at 85° C. After drying, the first cathode active material layer was coated with a layer of lithium cobaltate slurry (slurry of a second cathode active material layer) consisting of 97.8 wt % of lithium cobaltate (LCO) (wherein the particle size of lithium cobaltate is Dv50:13 μm, Dv90:38 μm), 0.8 wt % of polyvinylidene fluoride (PVDF) and 1.4 wt % of conductive carbon black, the total mass of the two active material layers being equal to that of the active material in Comparative Example 1. After the was dried, a first uncovered foil region of an electrode assembly (a single-side uncovered foil region outside the electrode assembly with its opposite side covered by a cathode active material layer) was coated with a layer of insulating layer slurry, the slurry consisted of 10% of polyvinylidene fluoride and 90% of aluminum oxide particles, and the coating speed was controlled to ensure that the ratio of the thickness of the first cathode active material layer to the thickness of the insulating layer was 1 and the coverage of the coating region was more than or equal to 90%. After coating, drying was performed, then cold pressing, cutting and slitting were performed and drying was performed under 85° C. vacuum conditions for 4 hours to obtain a cathode, the cold pressing pressure being 60 T and the cold pressing speed being 40 m/min.

Copper foil was adopted as an anode current collector, the surface of the copper foil was uniformly coated with a layer of graphite slurry, the slurry consisting of 97.7 wt % of artificial graphite, 1.3 wt % of sodium carboxymethylcellulose (CMC) and 1.0 wt % of styrene butadiene rubber (SBR), drying was performed at 85° C., then cold pressing, cutting and slitting were performed and drying was performed under 85° C. vacuum conditions for 4 hours to obtain an anode.

A solution of lithium salt $LiPF_6$ and a non-aqueous organic solvent (ethylene carbonate (EC):diethyl carbonate (DEC):propylene carbonate (PC):propylene propionate (PP):vinylene carbonate (VC)=20:30:20:28:2 by mass) mixed in a ratio of 8:92 by mass was used as an electrolyte for a lithium ion battery.

The cathode and the anode were wound, and the cathode and the anode were separated by a polyethylene separator, so that a wound electrode assembly was prepared. The electrode assembly was subjected to top-side sealing, code spraying, vacuum drying, electrolyte injection, high-temperature standing and then chemical formation and packaging to generate a finished lithium ion battery.

Example 2

The preparation method was the same as that of Example 1, except that the ratio of the thickness of the first cathode active material layer to the thickness of the insulating layer in Example 2 was 0.2.

Example 3

The preparation method was the same as that of Example 1, except that the ratio of the thickness of the first cathode active material layer to the thickness of the insulating layer in Example 3 was 0.5.

Example 4

The preparation method was the same as that of Example 1, except that the ratio of the thickness of the first cathode active material layer to the thickness of the insulating layer in Example 4 was 0.8.

Example 5

The preparation method was the same as that of Example 1, except that the ratio of the thickness of the first cathode active material layer to the thickness of the insulating layer in Example 5 was 1.5.

Example 6

The preparation method was the same as that of Example 1, except that the ratio of the thickness of the first cathode active material layer to the thickness of the insulating layer in Example 6 was 2.

Example 7

The preparation method was the same as that of Example 1, except that the ratio of the thickness of the first cathode active material layer to the thickness of the insulating layer in Example 7 was 3.

Example 8

The preparation method was the same as that of Example 1, except that the ratio of the thickness of the first cathode active material layer to the thickness of the insulating layer in Example 8 was 5.

Example 9

The preparation method was the same as that of Example 1, except that the ratio of the thickness of the first cathode active material layer to the thickness of the insulating layer in Example 9 was 7.

Example 10

The preparation method was the same as that of Example 1, except that the ratio of the thickness of the first cathode active material layer to the thickness of the insulating layer in Example 10 was 10.

Example 11

The preparation method was the same as that of Example 1, except that the thickness of the first cathode active material layer in Example 11 was 0.5 µm.

Example 12

The preparation method was the same as that of Example 1, except that the thickness of the first cathode active material layer in Example 12 was 1 µm.

Example 13

The preparation method was the same as that of Example 1, except that the thickness of the first cathode active material layer in Example 13 was 2 µm.

Example 14

The preparation method was the same as that of Example 1, except that the thickness of the first cathode active material layer in Example 14 was 3 µm.

Example 15

The preparation method was the same as that of Example 1, except that the thickness of the first cathode active material layer in Example 15 was 7 µm.

Example 16

The preparation method was the same as that of Example 1, except that the thickness of the first cathode active material layer in Example 16 was 10 µm.

Example 17

The preparation method was the same as that of Example 1, except that the thickness of the first cathode active material layer in Example 17 was 15 µm.

Example 18

The preparation method was the same as that of Example 1, except that the Dv90 of the first cathode active material in Example 18 was 2 µm.

Example 19

The preparation method was the same as that of Example 1, except that the Dv90 of the first cathode active material in Example 19 was 5 µm.

Example 20

The preparation method was the same as that of Example 1, except that the Dv90 of the first cathode active material in Example 20 was 15 µm.

Example 21

The preparation method was the same as that of Example 1, except that the Dv90 of the first cathode active material in Example 21 was 20 µm.

Example 22

The preparation method was the same as that of Example 1, except that the coverage of the insulating layer coating area in Example 22 was 50%.

Example 23

The preparation method was the same as that of Example 1, except that the coverage of the insulating layer coating area in Example 23 was 60%.

Example 24

The preparation method was the same as that of Example 1, except that the coverage of the insulating layer coating area in Example 24 was 70%.

Example 25

The preparation method was the same as that of Example 1, except that the coverage of the insulating layer coating area in Example 25 was 80%.

Example 26

The preparation method was the same as that of Example 1, except that the coverage of the insulating layer coating area in Example 26 was 95%.

Example 27

The preparation method was the same as that of Example 1, except that the coverage of the insulating layer coating area in Example 27 was 98%.

Example 28

The preparation method was the same as that of Example 1, except that the coverage of the insulating layer coating area in Example 28 was 99%.

Example 29

The preparation method was the same as that of Example 1, except that the coverage of the insulating layer coating area in Example 29 was 100%.

Example 30

The preparation method was the same as that of Example 1, except that all uncovered foil regions in the lithium ion battery were coated with an insulating layer after the cathode was dried in Example 30.

Example 31

The preparation method was the same as that of Example 1, except that the first uncovered foil region (a single-side uncovered foil region outside the electrode assembly with its opposite side covered by a cathode active material layer) and the second uncovered foil regions (double-side uncovered foil regions outside the electrode assembly with neither side covered by the cathode active material) of the electrode assembly were both coated with an insulating layer after the cathode was dried in Example 31.

Example 32

The preparation method was the same as that of Example 1, except that the first uncovered foil region (a single-side uncovered foil region outside the electrode assembly with its opposite side covered by a cathode active material layer) and the third uncovered foil region (a tab welded region inside the electrode assembly) of the electrode assembly were both coated with an insulating layer after the cathode was dried in Example 32.

Comparative Example 4

The preparation method was the same as that of Example 1, except that the ratio of the thickness of the first cathode active material layer to the thickness of the insulating layer in Comparative example 4 was 0.1.

Comparative Example 5

The preparation method was the same as that of Example 1, except that the ratio of the thickness of the first cathode active material layer to the thickness of the insulating layer in Comparative example 5 was 15.

Comparative Example 6

The preparation method was the same as that of Example 1, except that the ratio of the thickness of the first cathode active material layer to the thickness of the insulating layer in Comparative example 6 was 20.

After the finished lithium ion batteries of the above embodiments and comparative examples were obtained, the capacity, thickness, width and length of the finished products were recorded to determine the volume energy density of the lithium ion batteries. Subsequently, the lithium ion batteries of the above embodiments and comparative examples were subjected to battery capacity test and nail piercing test.

Battery Capacity Test:

An electrochemical device to be tested (lithium ion battery) was left to stand for 30 mins in an environment of 25±3° C. and charged to a voltage of 4.4 V (rated voltage) at a constant current rate of 0.5 C, then charged at a constant voltage until the charge-discharge rate reached 0.05 C, and the lithium ion battery to be tested was left to stand for 30 mins. After that, the battery was discharged to 3.0 V at a rate of 0.2 C, and the lithium ion battery to be tested was left to stand for 30 mins. Finally, the discharge capacity was taken as the actual battery capacity of the battery.

Lithium ion battery energy density=discharge capacity/(length*width*thickness of lithium ion battery).

Nail Piercing Test:

Ten electrochemical devices (lithium ion batteries) to be tested were charged at a constant current of 0.5 C to a voltage of 4.4 V at normal temperature, and further charged at a constant voltage of 4.4 V to a current of 0.05 C to make them in a fully charged state at 4.4 V. After that, the lithium ion battery was pierced at normal temperature by a nail with a diameter of 4 mm (steel nail made of carbon steel with a taper of 16.5 mm and a total length of 100 mm) at a piercing speed of 30 mm/s, the piercing depth was based on the taper of the nail passing through the lithium ion battery, and whether the lithium ion battery smoked, caught fire or exploded was observed. If not, the lithium ion battery was considered to pass the nail piercing test.

The experimental parameters and measurement results of the various embodiments and comparative examples are shown in Table 1 below.

TABLE 1

| | Inorganic particles in insulating layer | First cathode active material | Ratio of thickness of first cathode active material layer to thickness of insulating layer (-) | Thickness of first cathode active material layer (μm) | Particle size of first cathode active material layer (Dv90) (μm) | Coverage of insulating layer (-) | Position of insulating layer | Pass rate in nail piercing test | Energy density of lithium iron battery (Wh/L) |
|---|---|---|---|---|---|---|---|---|---|
| Example | | | | | | | | | |
| 1 | Aluminum oxide | Lithium iron phosphate | 1 | 5 | 10 | 90% | First uncovered foil region | 10/10 | 710 |

TABLE 1-continued

| | Inorganic particles in insulating layer | First cathode active material | Ratio of thickness of first cathode active material layer to thickness of insulating layer (-) | Thickness of first cathode active material layer (μm) | Particle size of first cathode active material layer (Dv90) (μm) | Coverage of insulating layer (-) | Position of insulating layer | Pass rate in nail piercing test | Energy density of lithium iron battery (Wh/L) |
|---|---|---|---|---|---|---|---|---|---|
| 2 | Aluminum oxide | Lithium iron phosphate | 0.2 | 5 | 10 | 90% | First uncovered foil region | 6/10 | 719 |
| 3 | Aluminum oxide | Lithium iron phosphate | 0.5 | 5 | 10 | 90% | First uncovered foil region | 10/10 | 715 |
| 4 | Aluminum oxide | Lithium iron phosphate | 0.8 | 5 | 10 | 90% | First uncovered foil region | 10/10 | 712 |
| 5 | Aluminum oxide | Lithium iron phosphate | 1.5 | 5 | 10 | 90% | First uncovered foil region | 10/10 | 705 |
| 6 | Aluminum oxide | Lithium iron phosphate | 2 | 5 | 10 | 90% | First uncovered foil region | 10/10 | 698 |
| 7 | Aluminum oxide | Lithium iron phosphate | 3 | 5 | 10 | 90% | First uncovered foil region | 10/10 | 691 |
| 8 | Aluminum oxide | Lithium iron phosphate | 5 | 5 | 10 | 90% | First uncovered foil region | 8/10 | 684 |
| 9 | Aluminum oxide | Lithium iron phosphate | 7 | 5 | 10 | 90% | First uncovered foil region | 6/10 | 675 |
| 10 | Aluminum oxide | Lithium iron phosphate | 10 | 5 | 10 | 90% | First uncovered foil region | 5/10 | 662 |
| 11 | Aluminum oxide | Lithium iron phosphate | 1 | 0.5 | 10 | 90% | First uncovered foil region | 6/10 | 733 |
| 12 | Aluminum oxide | Lithium iron phosphate | 1 | 1 | 10 | 90% | First uncovered foil region | 7/10 | 729 |
| 13 | Aluminum oxide | Lithium iron phosphate | 1 | 2 | 10 | 90% | First uncovered foil region | 8/10 | 726 |
| 14 | Aluminum oxide | Lithium iron phosphate | 1 | 3 | 10 | 90% | First uncovered foil region | 9/10 | 719 |
| 15 | Aluminum oxide | Lithium iron phosphate | 1 | 7 | 10 | 90% | First uncovered foil region | 10/10 | 701 |
| 16 | Aluminum oxide | Lithium iron phosphate | 1 | 10 | 10 | 90% | First uncovered foil region | 10/10 | 685 |
| 17 | Aluminum oxide | Lithium iron phosphate | 1 | 15 | 10 | 90% | First uncovered foil region | 10/10 | 660 |
| 18 | Aluminum oxide | Lithium iron phosphate | 1 | 5 | 2 | 90% | First uncovered foil region | 10/10 | 710 |
| 19 | Aluminum oxide | Lithium iron phosphate | 1 | 5 | 5 | 90% | First uncovered foil region | 10/10 | 710 |
| 20 | Aluminum oxide | Lithium iron phosphate | 1 | 5 | 15 | 90% | First uncovered foil region | 8/10 | 710 |
| 21 | Aluminum oxide | Lithium iron phosphate | 1 | 5 | 20 | 90% | First uncovered foil region | 6/10 | 710 |
| 22 | Aluminum oxide | Lithium iron phosphate | 1 | 5 | 10 | 50% | First uncovered foil region | 5/10 | 710 |
| 23 | Aluminum oxide | Lithium iron phosphate | 1 | 5 | 10 | 60% | First uncovered foil region | 6/10 | 710 |
| 24 | Aluminum oxide | Lithium iron phosphate | 1 | 5 | 10 | 70% | First uncovered foil region | 8/10 | 710 |

TABLE 1-continued

|  | Inorganic particles in insulating layer | First cathode active material | Ratio of thickness of first cathode active material layer to thickness of insulating layer (−) | Thickness of first cathode active material layer (μm) | Particle size of first cathode active material layer (Dv90) (μm) | Coverage of insulating layer (−) | Position of insulating layer | Pass rate in nail piercing test | Energy density of lithium iron battery (Wh/L) |
|---|---|---|---|---|---|---|---|---|---|
| 25 | Aluminum oxide | lithium iron phosphate | 1 | 5 | 10 | 80% | First uncovered foil region | 9/10 | 710 |
| 26 | Aluminum oxide | Lithium iron phosphate | 1 | 5 | 10 | 95% | First uncovered foil region | 10/10 | 710 |
| 27 | Aluminum oxide | Lithium iron phosphate | 1 | 5 | 10 | 98% | First uncovered foil region | 10/10 | 710 |
| 28 | Aluminum oxide | Lithium iron phosphate | 1 | 5 | 10 | 99% | First uncovered foil region | 10/10 | 710 |
| 29 | Aluminum oxide | Lithium iron phosphate | 1 | 5 | 10 | 100% | First uncovered foil region | 10/10 | 710 |
| 30 | Aluminum oxide | Lithium iron phosphate | 1 | 5 | 10 | 90% | All uncovered foil regions | 10/10 | 689 |
| 31 | Aluminum oxide | Lithium iron phosphate | 1 | 5 | 10 | 90% | First uncovered foil region and second uncovered foil region | 10/10 | 702 |
| 32 | Aluminum oxide | Lithium iron phosphate | 1 | 5 | 10 | 90% | First uncovered foil region and third uncovered foil region | 10/10 | 704 |
| Comparative Example |  |  |  |  |  |  |  |  |  |
| 1 | / | / | / | / | / | / | / | 0/10 | 740 |
| 2 | / | Lithium iron phosphate | / | 5 | 10 | / | / | 2/10 | 721 |
| 3 | Aluminum oxide | / | / | / | / | 90% | First uncovered foil region | 1/10 | 730 |
| 4 | Aluminum oxide | Lithium iron phosphate | 0.1 | 5 | 10 | 90% | First uncovered foil region | 4/10 | 720 |
| 5 | Aluminum oxide | Lithium iron phosphate | 15 | 5 | 10 | 90% | First uncovered foil region | 3/10 | 644 |
| 6 | Aluminum oxide | Lithium iron phosphate | 20 | 5 | 10 | 90% | First uncovered foil region | 2/10 | 631 |

By comparing Comparative Examples 1, 2, 3 and Example 1, it can be seen that by adopting the double cathode active material layers in the cathode active material layer covering region and the insulating layer in the uncovered foil region, the pass rate of the lithium ion battery in the nail piercing test was improved to varying degrees, and little influence was caused on the energy density of the lithium ion battery.

From Comparative Examples 4-6 and Examples 1-10, it can be seen that with the increase of the ratio of the thickness of the first cathode active material layer to the thickness of the insulating layer, the energy density of the lithium ion battery decreased, and the pass rate in the nail piercing test decreased for the lithium ion batteries where the ratio of the thickness of the first cathode active material layer to the thickness of the insulating layer was either too low or too high.

From Examples 11-17, it can be seen that the energy density of the lithium ion battery decreased with the increase of the thickness of the first cathode active material layer; meanwhile, the pass rate of the lithium ion battery in the nail piercing test increased with the increase of the thickness of the first cathode active material layer.

From Examples 18-21, it can be seen that with the increase of the particle size Dv90 of the first cathode active material, the energy density of the lithium ion battery did not change much, but using an excessively high particle size Dv90 of the first cathode active material caused the pass rate of the lithium ion battery in the nail piercing test to decrease.

From Examples 22-29, it can be seen that with the increase of the coverage of the insulating layer, the energy density of the lithium ion battery did not change much, while the nail piercing test of lithium ion batteries with the coverage of the insulating layer below a certain level decreased.

From Example 1 and Examples 30-32, it can be seen that the insulating layer can be disposed on all uncovered foil regions of the cathode current collector (i.e., on all surfaces that is not facing the anode active material), wherein the lithium ion battery coated with the insulating layer only on the first uncovered foil region had the highest energy density.

The above description summarizes the features of several embodiments, which enables those of ordinary skill in the art to better understand various aspects of the present application. Those of ordinary skill in the art can easily use the present application as a basis for designing or modifying other compositions in order to achieve the same objectives and/or achieve the same advantages as the embodiments herein applied. Those of ordinary skill in the art will also understand that these equal examples do not depart from the spirit and scope of the present application, and they can make various changes, substitutions and modifications to the present application without departing from the spirit and scope of the present application. Although the methods disclosed herein have been described with reference to specific operations performed in a specific order, it should be understood that these operations may be combined, subdivided, or reordered to form equivalent methods without departing from the teachings of the present application. Therefore, unless specifically indicated herein, the present application is not limited to the order and grouping of operations described herein.

What is claimed is:

1. An electrochemical device comprising an aluminum-plastic film and an electrode assembly packaged in the aluminum-plastic film; wherein the electrode assembly comprises a cathode, a separator and an anode, wherein the cathode comprises:
    a cathode current collector;
    a first cathode active material layer comprising a first material, wherein the first material comprises a first cathode active material;
    a second cathode active material layer comprising a second cathode active material; wherein the first cathode active material layer is disposed between the cathode current collector and the second cathode active material layer, and the first cathode active material layer directly contacts the second cathode active material layer; wherein the first cathode active material layer is directly disposed on a first region of a surface of the cathode current collector facing an anode active material layer of the anode; wherein a thickness of the first cathode active material layer is greater than Dv50 of the first cathode active material; and
    an insulating layer disposed on a second region of the surface of the cathode current collector not facing the anode active material layer of the anode;
    wherein a ratio of the thickness of the first cathode active material layer to a thickness of the insulating layer is from 0.2 to 10.

2. The electrochemical device according to claim 1, wherein the electrode assembly is of a wound structure, and an outermost electrode of the wound structure is the cathode.

3. The electrochemical device according to claim 1, wherein the second region of the surface of the cathode current collector comprises a first uncovered foil region located as an outer winding portion of the electrode assembly, an opposite side of the first uncovered foil region is covered by a third cathode active material layer disposed on an opposite side of the cathode current collector from the first cathode active material layer and the second cathode active material layer, and the insulating layer is at least directly disposed on the first uncovered foil region.

4. The electrochemical device according to claim 3, wherein the second region of the surface of the cathode current collector further comprises a second uncovered foil region located as the outer winding portion of the electrode assembly, an opposite side of the second uncovered foil region is not covered by the third cathode material layer, and the insulating layer is directly disposed on the second uncovered foil region.

5. The electrochemical device according to claim 1, wherein an average particle size of the first cathode active material is smaller than an average particle size of the second cathode active material, and the average particle size of the first cathode active material is from 0.2 µm to 15 µm.

6. The electrochemical device according to claim 1, wherein a particle size, by 90% of the cumulative volume, of the first cathode active material is 40 µm or less.

7. The electrochemical device according to claim 1, wherein a ratio of an average particle size of the first cathode active material to an average particle size of the second cathode active material is 1:1 to about 1:40.

8. The electrochemical device according to claim 1, wherein the thickness of the first cathode active material layer is from 0.5 µm to 15 µm, and a thickness of the second cathode active material layer is from 30 µm to 1000 µm.

9. The electrochemical device according to claim 1, wherein a coverage of the insulating layer is at least about 50%, wherein the coverage is a percentage of a difference obtained after a total coating area of a region to be coated minus an exposed area of a coating layer exposed through holes in the coating layer in the total coating area.

10. The electrochemical device according to claim 1, wherein the first cathode active material and the second cathode active material are each independently selected from the group consisting of lithium cobaltate, lithium iron phosphate, lithium manganese iron phosphate, sodium iron phosphate, lithium vanadium phosphate, sodium vanadium phosphate, oxy-lithium-vanadium phosphate, oxy-sodium-vanadium phosphate, lithium vanadate, lithium manganate, lithium nickelate, nickel cobalt lithium manganate, lithium-rich manganese-based materials, nickel cobalt lithium aluminate, lithium titanate, and combinations thereof.

11. The electrochemical device according to claim 1, wherein the insulating layer comprises inorganic particles and polymer; wherein the inorganic particles are selected from the group consisting of aluminum oxide, silicon dioxide, magnesium oxide, titanium oxide, hafnium dioxide, tin oxide, cerium oxide, nickel oxide, zinc oxide, calcium oxide, zirconium dioxide, yttrium oxide, silicon carbide, boehmite, aluminum hydroxide, magnesium hydroxide, calcium hydroxide, barium sulfate, and combinations thereof; and
    the polymer is selected from the group consisting of homopolymers of vinylidene fluoride, copolymers of vinylidene fluoride, copolymers of hexafluoropropylene, polystyrene, polyphenylacetylene, sodium poly(vinyl acid), potassium poly(vinyl acid), polyacrylate ester, polyacrylic acids, polyacrylonitrile, polyvinylpyrrolidone, polyvinylether, polymethyl methacrylate, polyethylene, polypropylene, polytetrafluoroethylene, and combinations thereof.

12. The electrochemical device according to claim 1, wherein the first cathode active material layer and the second cathode active material layer each independently comprises a binder, and a binder content in the first cathode active material layer is higher than a binder content in the second cathode active material layer.

13. The electrochemical device according to claim 11, wherein the first cathode active material layer and the second cathode active material layer each independently further comprise a conductive agent and a binder; wherein each binder is selected from the group consisting of polyvinylidene fluoride, copolymers of vinylidene fluoride and hexafluoropropylene, polyamides, polyacrylonitrile, polyacrylate ester, polyacrylic acids, polyacrylate salt, sodium carboxymethylcellulose, polyvinylpyrrolidone, polyvinylether, polymethylmethacrylate, polytetrafluoroethylene, polyhexafluoropropylene, styrene butadiene rubber, and combinations thereof; and each conductive agent is selected from the group consisting of carbon nanotubes, conductive carbon black, graphene, carbon fiber, and combinations thereof.

14. The electrochemical device according to claim 1, wherein the anode comprises an anode current collector and the anode active material layer disposed on the anode current collector, the anode active material layer comprises an anode active material, and the anode active material comprises carbon material.

15. The electrochemical device according to claim 1, wherein the separator comprises at least one selected from the group consisting of polyethylene, polypropylene, polyethylene terephthalate, polyimide, and aramid.

16. The electrochemical device according to claim 1, wherein a particle size, by 90% of the cumulative volume, of the first cathode active material is 20 μm or less.

17. The electrochemical device according to claim 1, wherein a particle size, by 90% of the cumulative volume, of the first cathode active material is 5 μm or less.

18. The electrochemical device according to claim 1, wherein the thickness of the first cathode active material layer is from 2 μm to 15 μm.

19. The electrochemical device according to claim 1, wherein the thickness of the first cathode active material layer is from 7 μm to 15 μm.

20. An electronic device comprising an electrochemical device comprising an aluminum-plastic film and an electrode assembly packaged in the aluminum-plastic film; wherein the electrode assembly comprises a cathode, a separator and an anode; wherein the cathode comprises:

a cathode current collector;

a first cathode active material layer comprising a first material, wherein the first material comprises a first cathode active material;

a second cathode active material layer comprising a second cathode active material; wherein the first cathode active material layer is disposed between the cathode current collector and the second cathode active material layer, and the first cathode active material layer directly contacts the second cathode active material layer; wherein the first cathode active material layer is directly disposed on a first region of a surface of the cathode current collector facing an anode active material layer of the anode; wherein a thickness of the first cathode active material layer is greater than Dv50 of the first cathode active material; and an insulating layer disposed on a second region of the surface of the cathode current collector not facing the anode active material layer of the anode; and wherein a ratio of the thickness of the first cathode active material layer to a thickness of the insulating layer is from 0.2 to 10.

* * * * *